(12) United States Patent
Smith et al.

(10) Patent No.: US 7,539,626 B2
(45) Date of Patent: *May 26, 2009

(54) SYSTEM AND METHOD FOR DOCUMENTING DELAYS ASSOCIATED WITH A PROJECT

(75) Inventors: Steven G. Smith, Roswell, GA (US); Ralph J. Mills, Jr., Atlanta, GA (US); Mitchell E. Davis, Palmetto, GA (US); Roy Edward Glascoe, Jr., Duluth, GA (US)

(73) Assignee: AT&T Intellectual Property I L.P., Reno, NV (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/609,417

(22) Filed: Dec. 12, 2006

(65) Prior Publication Data

US 2007/0094377 A1 Apr. 26, 2007

Related U.S. Application Data

(63) Continuation of application No. 10/029,800, filed on Dec. 31, 2001, now Pat. No. 7,149,702.

(51) Int. Cl.
*G06Q 10/00* (2006.01)
(52) U.S. Cl. .......................................... 705/8
(58) Field of Classification Search ................... 705/8
See application file for complete search history.

(56) References Cited

U.S. PATENT DOCUMENTS

| | | | |
|---|---|---|---|
| 5,826,270 A | 10/1998 | Rutkowski | |
| 5,873,070 A | 2/1999 | Bunte | |
| 5,884,266 A | 3/1999 | Dvorak | |
| 5,915,001 A | 6/1999 | Uppaluru | |
| 5,953,389 A | 9/1999 | Pruett | |
| 5,974,135 A | 10/1999 | Breneman | |
| 6,035,285 A | 3/2000 | Schlect | |
| 6,223,541 B1 | 5/2001 | Farrag | |
| 6,396,833 B1 | 5/2002 | Zhang | |
| 6,445,774 B1 | 9/2002 | Kidder | |
| 6,587,822 B2 | 7/2003 | Brown | |
| 6,587,851 B1 | 7/2003 | Ditcharo | |
| 6,671,824 B1 | 12/2003 | Hyland | |
| 6,724,406 B1 | 4/2004 | Kelley | |
| 6,763,376 B1 | 7/2004 | Devine | |
| 6,971,072 B1 | 11/2005 | Stein | |
| 7,111,243 B1 | 9/2006 | Ballard | |
| 2003/0006913 A1 | 1/2003 | Joyce | |
| 2003/0008661 A1 | 1/2003 | Joyce | |

(Continued)

*Primary Examiner*—Jonathan G Sterrett
(74) *Attorney, Agent, or Firm*—Withers & Keys, LLC

(57) ABSTRACT

A system and method for documenting delays associated with a project. The present invention includes provisions that enable a field personnel working on a project on the field to document excusable delays as the delays are encountered. The field personnel is equipped with a communications device that has access to a server. During a communications session between the communications device and the server, the field personnel uses the communications device to upload project information related to the delays to the server. The server then invokes or updates a DMT to document the time associated with the delays. The delay time documented in the DMT is then subtracted from a total time reported by a maintenance clock associated with the project.

20 Claims, 4 Drawing Sheets

U.S. PATENT DOCUMENTS

| | | |
|---|---|---|
| 2003/0046397 A1 | 3/2003 | Trace |
| 2003/0139932 A1 | 7/2003 | Shao |
| 2004/0014479 A1 | 1/2004 | Milman |
| 2004/0209602 A1 | 10/2004 | Joyce |
| 2008/0071565 A1 | 3/2008 | Dennis |

SYSTEM AND METHOD FOR DOCUMENTING DELAYS ASSOCIATED WITH A PROJECT

RELATED CASES

The present application is a continuation of U.S. application Ser. No. 10/029,800, entitled SYSTEM AND METHOD FOR DOCUMENTING DELAYS ASSOCIATED WITH A PROJECT, and filed on Dec. 31, 2001 now U.S. Pat. No. 7,149,702.

FIELD OF THE INVENTION

The present invention relates generally to the field of project management and, more particularly, to a system and method for documenting delays associated with a project.

BACKGROUND OF THE INVENTION

It makes good business sense to keep all promises made to customers. This is particularly true for service-oriented businesses that could suffer significant financial losses for missed appointments. In certain regulated industries, there are public service commission rules that impose monetary fines on service providers for failing to provide timely service. For example, in the telecommunications industry, there are Service Installation Guarantees (SIG) rules that require telephone companies to pay fines for failures to install services at the promised time. In addition, telephone companies must issue rebates to customers or pay fines if the telephone companies fail to clear troubles reported on existing services or fail to provide certain services within guidelines and timeframes specified by the applicable public service commissions.

Field technicians of telephone companies, sometimes known as "Installation and Maintenance" technicians, visit customer sites to install new equipment, set up new services, or repair existing equipment. The field technicians, once in the field, are not always able to complete the assigned tasks on time due to a number of reasons. For example, in some instances, the customer may specifically request maintenance efforts be delayed until a later time that is convenient to the customer. In other instances, the customer may be unavailable to accept restoration of service even after all repairs have been completed. In still other instances, the customer may specifically request that completion of the trouble report be delayed until the circuit is verified as working properly. If the time associated with these delays is not documented and discounted, then the entire amount of time that is accumulated in a maintenance "clock" associated with the project would be considered for fines or rebates purposes. As a result, even though the delays were not due to failures by the field technicians or to the telephone company, the telephone company can still be fined in accordance with the SIG rules.

Realizing that they might have been unnecessarily paying fines for delays that were in fact excusable, some telephone companies have implemented a procedure to stop the maintenance clock. The procedure involves documenting excusable delay time of a project with a delay maintenance timer ("DMT"). When the project is completed, time accumulated by the DMT (the DMT time) is subtracted from the total time accumulated by the conventional maintenance clock associated with the project.

Currently, invocation or operation of the DMT involves a number of steps. First, a field technician is dispatched on a trouble report to a field location of a customer. Second, the field technician encounters one or more of the following exemplary delays that justifies invocation of the DMT:

The customer specifically requests that maintenance efforts be delayed until a specified time.
   The customer is not available to accept restoration of service after all repairs have been completed.
   The customer specifically requests that completion of the trouble report be delayed until the circuit is verified as working properly.

Third, after encountering one or more of the above exemplary delays, the field technician calls a tester in the office. Several attempts to make the call may be required since the tester may not be available when the field technician calls. Furthermore, the field technician may be put on hold as the tester collects the information or otherwise interrupted during the call. As a result, significant time is wasted.

Fourth, when the field technician is finally in conversation with the tester, the field technician provides the tester with the following information: customer name; customer telephone number; and reason or reasons for invoking the DMT. The time the field technician must spend in conveying the information reduces his or her job efficiency and may increase costs to customers. Furthermore, miscommunications between the field technician and the tester may cause incorrect information to be transferred. For example, the tester may not accurately interpret the information provided by the field technician. Finally, the tester may call the customer to verify the conditions. If the request is deemed to be valid, the tester then documents the delay to the DMT.

As implemented currently, the current procedure is highly inefficient. Thus, there is a need for a system and method that can improve the current procedure. Specifically, there is a need for a system and method that can allow the field technician to input the required information directly in the DMT system without the tester, thus allowing the DMT to be invoked sooner.

SUMMARY OF THE INVENTION

The present invention includes provisions that enable a field personnel working on a project in the field to document excusable delays as the delays are encountered. The field personnel is equipped with a communications device that has access to a server in the office from the field. During a communications session between the communications device and the server, the field personnel uses the communications device to upload project information related to the delays to the server. The server then invokes or updates a DMT to document the time associated with the delays. The delay time documented in the DMT is then subtracted from a total time reported by a maintenance clock associated with the project.

One embodiment of the invention includes a communications device, a server, and a systems interface that facilitates communications sessions between the communications device and the server. The communications device is operable by a user and it is adapted to receive from the user project information related to a delay associated with a project. The server is accessible by the communications device via a communications network during a communications session to receive the project information from the communications device. The server is further adapted to update a delay maintenance timer with the project information.

Another embodiment of the invention includes a communications device, a server, a systems interface, a DMT, and a maintenance clock. The communications device is operable by a user, and the communications device is adapted to receive from the user project information related to a delay associated with a project. The DMT is accessible by the communications device via a communications network during a communications session to receive the project information from the communications device. The systems interface is coupled to the server, and it is adapted to facilitate uploading of the project information from the communications device to the server during the communications session. The DMT is accessible by the server, and the DMT is adapted to receive an amount of delay time based on the project information from the server. The maintenance clock keeps an overall time associated with the project. At the conclusion of the project, the amount of delay time documented in the DMT is discounted from the overall time.

A specific embodiment of the present invention adapted for the telecommunications industry involves the following exemplary steps, which do not have to be executed in the order in which they are discussed below.

First, a field technician is dispatched to the field to respond to a trouble reported by a customer. The field technician is equipped with a communications device that has access to a server in the office. The server maintains or is otherwise in communication with a DMT that is associated with the project. The communications device may be, for example, a laptop computer.

Second, when the field technician encounters a condition or a delay that justifies an invocation of the DMT, the field technician activates the communications device to launch a user interface associated with the DMT.

Third, the field technician inputs project information related to the delay via the user interface. The project information can include, for example, one or more of a name of a person authorizing invocation of the DMT; a customer name; a telephone number of the customer; a reason for the delay; a date and time the agreement was reached with the customer; a return date and time on which performance of the task should be resumed; and comments.

Fourth, the project information is uploaded from the communications device to the server during a communications session between the communications device and the server.

Fifth, during trouble closeout for the project, the server performs the following tasks: characterize the trouble as delay maintenance; transmit the project information to a maintenance system associated with the DMT; and notify the appropriate tester/center that the trouble is in a delay maintenance status. In an exemplary implementation of the present invention, the maintenance system may be, for example, the WFA-C (Work Force Administration-Control).

DETAILED DESCRIPTION OF THE INVENTION

Figure 1:
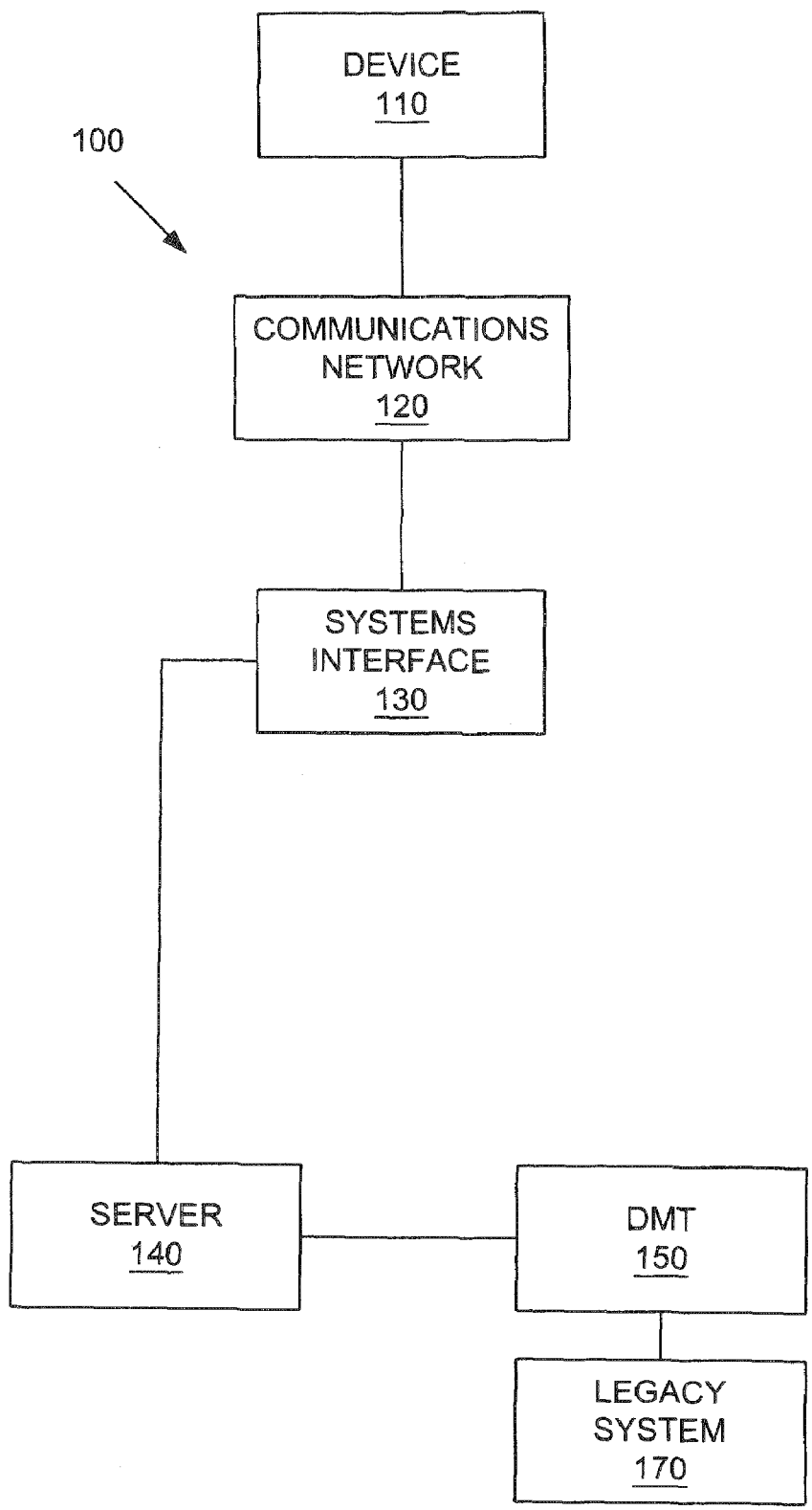
FIG. 1 is a schematic diagram showing the system architecture of an embodiment of the invention.

FIG. 1 is a schematic diagram showing the system architecture of an embodiment of the invention. System 100 includes device 110, communications network 120, systems interface 130, server 140, and DMT 150. Device 110 can be any communications device that is adapted to implement the present invention. For example, device 110 can be a laptop computer, a wireless telephone, or another device. Server 140 is preferably a mainframe type computer that is adapted to implement the present invention.

DMT 150 is a timer that accumulates time reported by a field technician using device 110. Although DMT 150 is shown as a component separate from server 140, DMT 150 can be integrated with server 140.

Device 110 communicates with server 140 via one or more of communications network 120 and systems interface 130. Communications network 120 can be a wireless or a wireline network. Systems interface 130 that is in between communications network 120 and server 140 enables the communications session to be established between device 110 and server 140.

Any suitable communications system and systems interface can be employed. The preferred systems interface for the present invention is disclosed in a commonly owned, U.S. patent application Ser. No. 09/343,815 [now issued as U.S. Pat. No. 6,738,815], entitled "Systems and Methods for Utilizing a Communications Network for Providing Mobile Users Access to Legacy Systems ("the '815 application"), filed on Jun. 30, 1999, the entirety of which is hereby incorporated by reference. The preferred systems interface is described in the aforementioned application in connection with the so-called "TechNet" system, which includes protocol servers and TechNet servers.

Device 110 is preferably a computer used by field technicians or other service personnel in the field to access server 140. As used herein, "computer" is used in the broadest sense of the term. A "computer" may be a microcomputer, minicomputer, laptop, personal data assistant, wireless telephone, two-way pager, processor, or any computerized device capable of transmitting and receiving data over a shared network. Preferably, device 110 is a ruggedized laptop computer.

Device 110 remotely accesses systems interface 130 through communications network 120. Communications network 120 may be any communications network that permits a remote computer to access a remote server. Communications network 120 could be a wireline network, wireless or cellular network, satellite network, or other network permitting a computer to communicate with a remote server. For example, communications network 120 can be a Public Switched Telephone Network (PSTN). Preferably, communications network 120 is a wireless network as disclosed in the '815 application.

Systems interface 130 provides a systems interface between remote (and preferably portable) device 110 and access server 140. Server 140 is generally a mainframe-type computer system that accesses and maintains data for a company. According to an embodiment, server 140 may have access to one or more legacy systems including a loop facility assignment control system; a loop maintenance operations system; a computer system for main frame operations; a mechanized loop testing system; a secure network element contract server; a mechanized time reporting system; a work activity statistical sampling plan system; and a work force administration system.

DMT 150 is a timer maintained by a company with which device 110 and systems interface 130 are associated. For example, DMT 150 may reside on legacy system 170 of the company. As used herein, "company" is intended to have the broadest meaning, and should be understood to include a company, corporation, association, partnership, limited liability company, and any other group of persons or entities that may store and share data via a shared server. In alternative embodiments of the present invention, DMT 150 can be part of server 140. Prior to the present invention, DMT 150 was inaccessible to field technicians operating device 110 logged-in via systems interface 130 to server 140.

The general operation of system 100 of FIG. 1 is as follows. A field technician with device 110 logs into systems interface 130 over communications network 120. After the log-in, systems interface 130 permits device 110 to upload information to server 140. The project information can include, for example, one or more of a name of a person authorizing invocation of the DMT; a customer name; a telephone number of the customer; a reason for the delay; a date and time the agreement was reached with the customer; a return date and time on which performance of the task should be resumed; and comments. Systems interface 130 processes the information, generates legacy transactions, and uploads the information to server 140. Server 140 can then invoke DMT 150 based on the project information. Finally, the time accumulated in DMT 150 is subtracted from a total time accumulated by a maintenance clock associated with the project.

Figure 2:
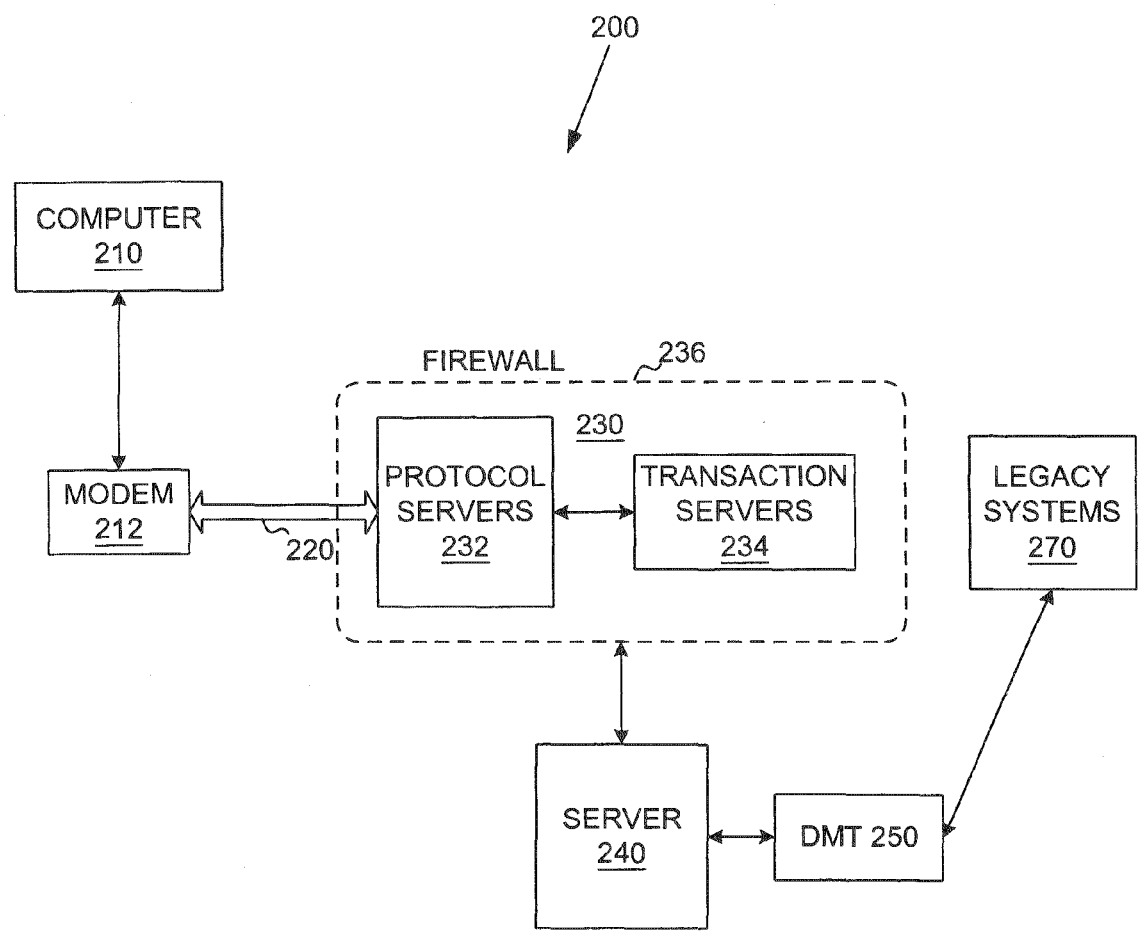
FIG. 2 is a schematic diagram of an exemplary preferred embodiment of the invention.

FIG. 2 is a schematic diagram of an exemplary preferred system for allowing field technicians to access a server according to another embodiment of the invention. System 200 includes computer 210, modem 212, communications network 220, systems interface 230 (which includes one or more protocol servers 232, one or more transaction servers 234, and firewall 236), server 240, DMT 250, and legacy systems 270.

Computer 210 is a remote and preferably portable computer (e.g., a ruggedized laptop or notebook computer) used by a field technician. However, computer 210 may be any of the devices discussed above for device 110 (FIG. 1).

Modem 212 is a modem for coding and decoding data transmitted between computer 210 and communications network 220. Depending on whether communications network 220 is wireline or wireless, modem 212 may be a conventional wireline modem or a so-called "cellular modem" or "wireless data modem." Preferably, a wireline modem can transmit at 56.6 kb/s or is a v.90 modem. A wireless modem can preferably transmit at about eight kb/s or is a RAM mobile data modem.

Communications network 220 may be a wireline communications network. For example, communications network 220 can be a PSTN, such as the BellSouth Communications Network. Alternatively, or in addition, communications network 220 may be a wireless or cellular communications network or a combination of a wireless and wireline elements. For example, communications network 220 can comprise the Cingular Wireless Network. Generally, modem 212 and communications network 220 can support transmission rates in the range of about eight to 56 kilobits per second, depending on whether the communications link is wireline or wireless.

Server 240 and DMT 250 are similar to and include any of the variations discussed in connection with server 140 and DMT 150, respectively, of FIG. 1. Legacy systems 270 can include one or more of legacy systems including a loop facility assignment control system; a loop maintenance operations system; a computer system for main frame operations; a mechanized loop testing system; a secure network element contract server; a mechanized time reporting system; a work activity statistical sampling plan system; and a work force administration system. The work force administration system can be, for example, the WFA-C (Work Force Administration-Control). DMT 250 can reside within server 240 or legacy systems 270. Preferably, DMT 250 resides at legacy systems 270. In any event, server 240 has access to DMT 250.

Computer 210 accesses server 240 via systems interface 230. Systems interface 230 can include protocol servers 232 and transaction servers 234. Systems interface 230 can be protected by firewall 236. Generally, protocol servers 232 provide a protocol and middleware interface between computer 210 and transaction servers 234. Protocol servers 232 may receive requests for information or other messages from computer 210; route requests or messages to input queues in transaction servers 234; receive responsive information from transaction servers 234; and route responsive information back to computer 210. Similarly, protocol servers 232 may receive information or other data from computer 210; route the information or data to input queues in transaction servers 234; and upload the information or data to server 240. The preferred systems interface for system 200 is disclosed in the '815 application.

In one specific implementation, protocol servers 232 may be NT servers running NetTech software from Broadbeam Corporation of Princeton, N.J. Transaction servers 234 may utilize Unix operating system software running an Informix database management system.

The general operation of the preferred system of FIG. 2 is now described. A user (e.g., a field technician) using computer 210 dials up or otherwise contacts protocol servers 232 via modem 212 and communications network 220. The user may dial up or otherwise contact protocol servers 232 over communications network 220 (either a wireline network or a wireless network). The field technician may log-in to protocol servers 232 using a user name and other data, such as a password and/or primary host group address. Once the field technician has been authenticated, a session (hereinafter, a "TechNet session") is established and computer 210 is connected to protocol servers 232 associated with the first network address.

Preferably, computer 210 is running application-specific client software for interfacing with server 240. According to an embodiment, computer 210 is running the TechNet client application disclosed in the '815 application.

Preferably, upon the log-in a primary screen or primary graphical user interface (GUI) is transmitted to computer 210. This is referred to herein as the "TechNet home page." In one embodiment of the invention, the TechNet home page has an icon or button that is dedicated for the DMT feature in accordance with the invention. The technician may use a pointing device (or other means such as a function key) on computer 210 to select and launch the DMT feature. When the DMT icon or button has been invoked by the technician, a DMT user interface appears on the screen of computer 210. The screen has fields appropriate for input of project information related to a delay encountered by the technician. The project information can include, for example, one or more of a name of a person authorizing invocation of the DMT; a customer name; a telephone number of the customer; a reason for the delay; a date and time the agreement was reached with the customer; a return date and time on which performance of the task should be resumed; and comments.

Figure 3:
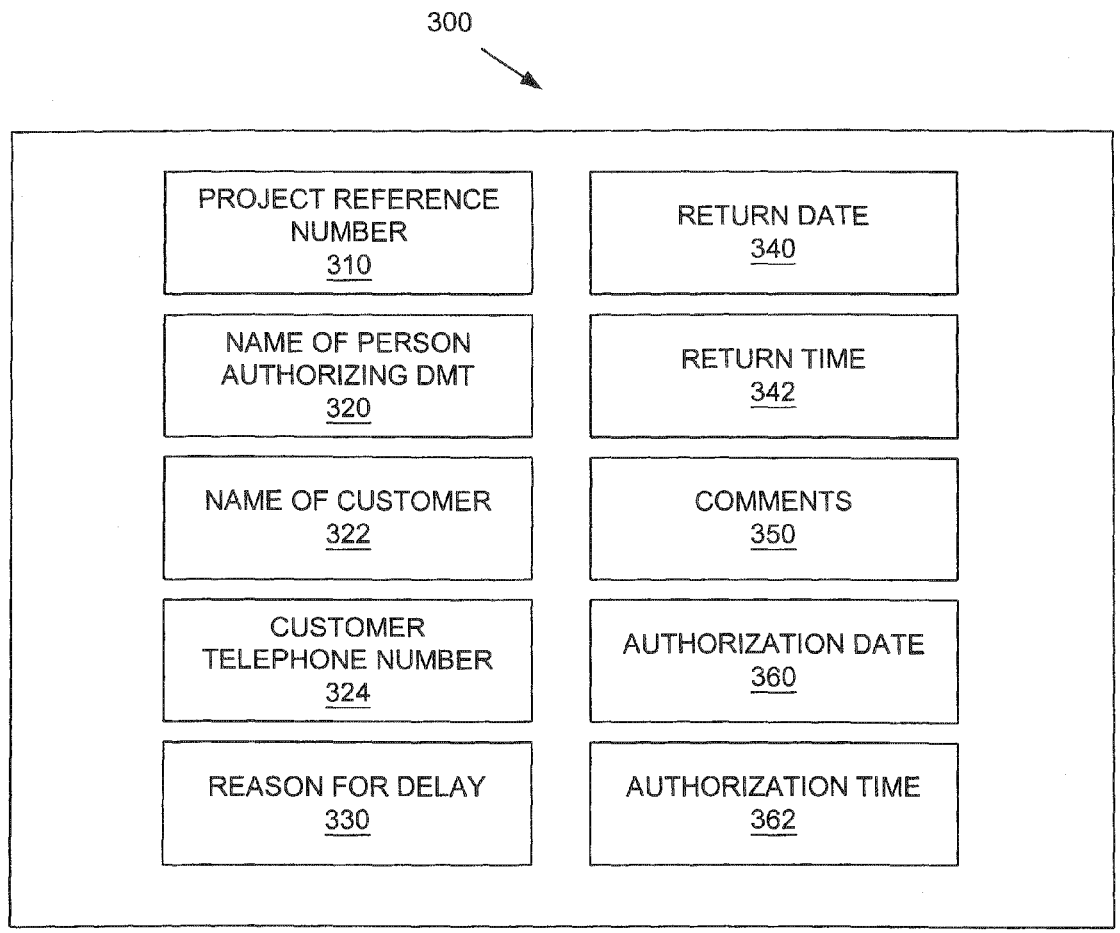
FIG. 3 is a schematic diagram showing an exemplary user interface associated with the DMT.

FIG. 3 is a schematic diagram showing an exemplary user interface associated with the DMT. User interface 300 includes fields, 310, 320, 322, 324, 330, 340, 342, 350, 360 and 362. The technician can input the project information in these fields. For example, fields 310, 320, 322, 324, 330, 340, 342, and 350 may be used to input the project reference number, the name of the person authorizing invocation of the DMT, the name of the customer, the customer's telephone number, the reason for the delay, the return date to resume the project, the return time on the return date, and comments, respectively. Preferably, user interface 300 also includes one or more default fields. For example, fields 360 and 362 may be used to input, automatically, the current date and time, respectively. The current date and time preferably represents the date and time on which the invocation of the DMT was authorized. Obviously, other fields may be included on user interface 300.

Referring back to FIG. 2, after the project information has been input using user interface 300, the project information is uploaded to server 240. Server 240 can then use the project information to invoke or update DMT 250 to document the delay. Finally, time accumulated in DMT 250 is subtracted from the total time of a maintenance clock associated with the project.

Preferably, in response to detecting that computer 210 seeks access to server 240, systems interface 230 determines whether server access is to be granted. For example, transaction servers 234 may confirm that the field technician is a valid user who is properly logged-in to a TechNet session. Transaction servers 234 may compare the field technician's user ID to a list of authorized (or prohibited) field technician users to determine if access to server 240 should be granted (or denied).

Figure 4:
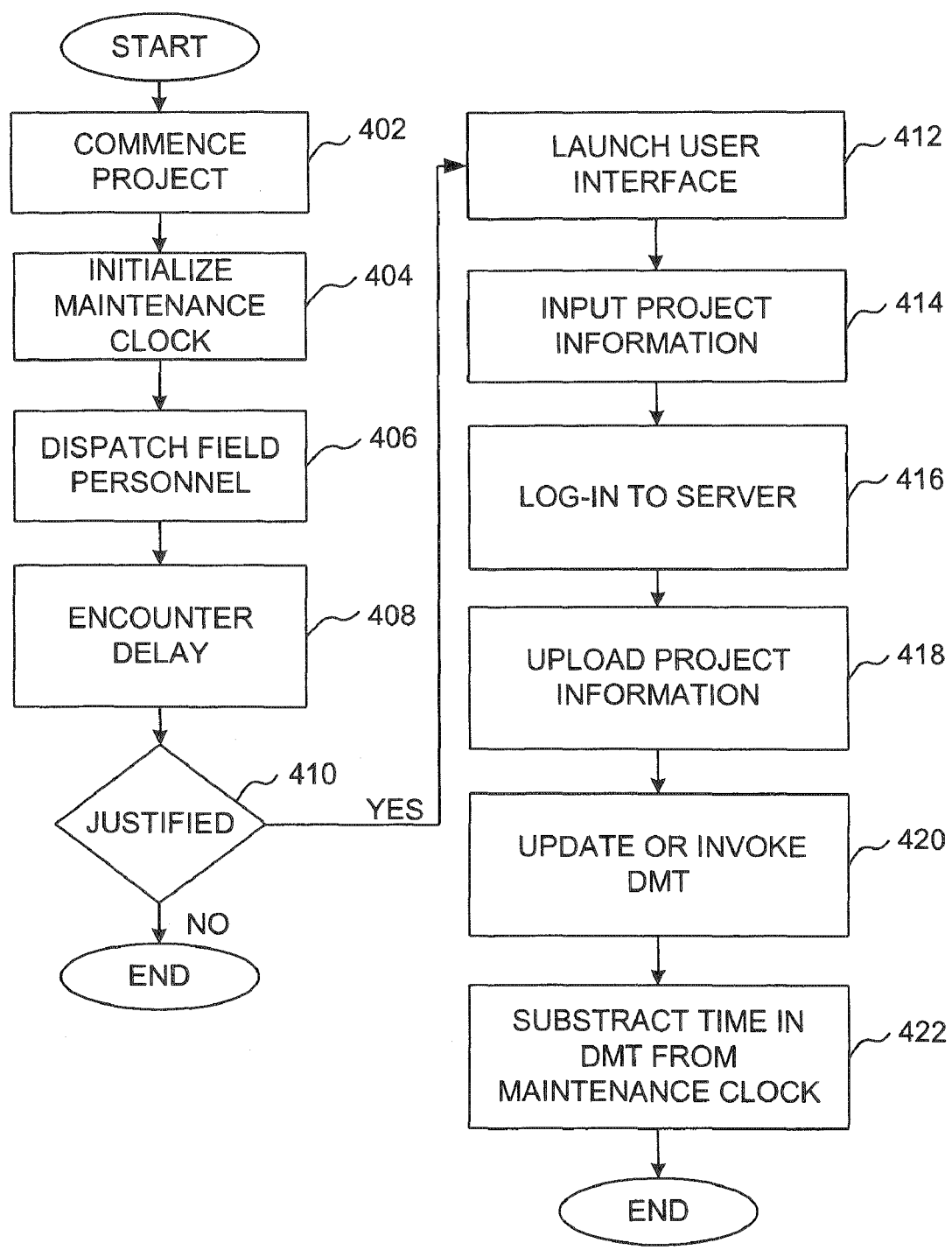
FIG. 4 is a flowchart showing exemplary steps involved in using one embodiment of the invention.

FIG. 4 is a flowchart showing exemplary steps involved in using one embodiment of the invention. FIG. 4 is explained below in connection with certain structure from the exemplary systems of FIG. 1 and FIG. 2. This is done to explain and illustrate the invention in a clear manner. However, the method is not limited or constrained by the structure of FIG. 1 or FIG. 2 or by any other structure. In addition, the following steps need not necessarily be performed in the order in which they are discussed below.

In step 402, a project is commenced or started. The project can be started when a customer calls to schedule a new installation, complain about a problem experienced at the customer's field location, or otherwise request that some repair or maintenance services be provided. A task is then scheduled.

In step 404, a maintenance clock is initialized to keep track of total time taken to work on the project. The maintenance clock may be any time keeping device, including a conventional clock or an electronic clock that resides within a computer system. Preferably, the maintenance clock is one that which has been used in the past for this purpose. In the telecommunications industry, the maintenance clock may be residing within a legacy system. For example, the maintenance clock can be a component of the WFA-C system.

In step 406, a service person is dispatched to the field location of the customer to perform the task. The service person may be a field technician. The dispatch may be done immediately after the maintenance clock is initialized. More often than not, however, the service person may not be available for dispatch until several days after the maintenance clock has been initialized.

In step 408, at the field location, the service person encounters a delay that prevents him or her to complete the scheduled task. The delay can be attributed to a number of reasons including, for example, one or more of the following:

A weather condition makes it unsafe to perform the task.

The service person does not have all the necessary equipment to complete the task.

A different service person with a more specialized skill set is needed to perform the task.

The customer specifically requests that maintenance efforts be delayed until a specified future return date and time.

The customer is not available to accept restoration of service after all repairs have been completed.

The customer specifically requests that completion of the trouble report be delayed until the circuit is verified as working properly.

In step 410, a determination is made on whether the delay encountered is a justifiable delay. A justifiable delay means that a DMT can be invoked. As discussed earlier, invocation of the DMT can result in a subtraction of time from the maintenance clock. Whether a delay is justifiable depends on rules set up be the industry, a governmental agency, or another entity. Furthermore, the customer may agree that the delay was caused by the customer and it should be considered a justifiable delay. For example, delay would not be a justifiable delay if the service person simply forgets to bring the proper tools to perform the task. If the delay is not a justifiable delay, the process ends, and no invocation of the DMT is made. If the delay is justifiable, however, the process goes to step 412.

In step 412, the service person launches an application of the invention on a communications device. The communications device may be one of device 110 and computer 210 as disclosed above. The application provides a user interface that is adapted in accordance with the present invention. The user interface preferably has an icon or a button that is associated with the DMT feature. The service person can invoke the DMT icon or button on the user interface and the DMT user interface screen appears. For example, the DMT user interface may be one that which is similar to user interface 300 discussed above and shown in FIG. 3.

In step 414, the service person inputs project information related to the delay. The project information may include, for example, one or more of the following:

the name of a person authorizing the DMT invocation (e.g., the name of the service person);

the customer's name;

the telephone number of the customer;

the reason for the delay;

the date and time an agreement was reached between the service person and the customer about the reason for the delay;

the new date and time on which performance of the task should be completed; and any additional comments.

It is noted that some of the project information may be generated automatically by the communications device, for example, the name of the service person may be a default input on user interface 300. In addition, the name and telephone number of the customer may be obtained from a ticket that dispatches the service person to the field location in the first place.

In step 416, the service person logs-in to the system (e.g., the TechNet system).

For example, the service person may log-in (e.g., onto server 140 of FIG. 1 or server 240 of FIG. 2) by entering a user ID. The log-in may occur over a wireline network or over a wireless network to establish a communications session between the communications device and the server.

In step 418, the project information is uploaded to the server.

In step 420, the server uses the project information to invoke the DMT (e.g., DMT 150 of FIG. 1 or DMT 250 of FIG. 2). Invocation of the DMT results in a documentation of time associated with the delay. The time documented may be, for example, the agreement time on which the delay was encountered and the new time on which the project should resume.

In step 422, at the closeout of the project, the delay time documented in the DMT is subtracted or discounted from the total time kept by the maintenance clock.

It is noted that the above steps do not necessarily have to occur in the order in which they are discussed above. For example, the communications session may be established before the service person inputs the project information.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for documenting delays comprising:
   a communications device operable by a user, wherein the communications device is adapted to:
      receive from the user project information related to a delay associated with a project, wherein the reason for delay includes at least one of adverse weather conditions, lack of equipment, lack of technical expertise, customer postponement; customer is unavailable to accept restoration of service until all repairs are completed, and circuit verification is required by customer,
      receive a selection of an option from a user interface to display a delay maintenance timer entry page where the project information related to the delay is entered and,
      receive user log in information to create a communication session and to upload the project information related to the delay during the communication session;
   a server accessible by the communications device via a communications network during the communications session to receive the project information from the communications device, wherein the project information includes at least a duration and a classification of an excusable delay, wherein further an excusable delay comprises at last one of adverse weather conditions, customer postponement, customer is unavailable to accept restoration of service until all repairs are completed, and circuit verification is required by customer;
   an elapsed time clock in communication with the server, wherein the elapsed time clock measures the total elapsed time from initiation to completion of the project;
   a delay maintenance timer in communication with the server, wherein the delay maintenance timer aggregates all excusable delays encountered during the project in response to invocation by the server;
   a systems interface coupled to the server, wherein the systems interface is adapted to facilitate uploading of the project information from the communications device to the server during the communications session, wherein the server is further adapted to invoke the delay maintenance timer by submitting the project information related to the delay maintenance timer, wherein further at the completion of the project the server subtracts the aggregated excusable delay on the delay maintenance timer from the total elapsed time to determine a discounted project time, wherein the discounted project time is compared to a service installation guarantee threshold to determine if the project was completed within the service installation guarantee threshold; and
   a maintenance clock that keeps an overall time associated with the project, wherein the amount of delay time is discounted from the overall time.

2. The system of claim 1, wherein one or both of the delay maintenance timer and the maintenance clock are associated with a legacy system.

3. The system of claim 2, wherein the legacy system is a work force administration system.

4. The system of claim 1, wherein the systems interface has provisions to determine whether the user is an authorized user.

5. The system of claim 1, wherein the project information includes at least one of a reason for the delay, a name of a person authorizing invocation of the delay maintenance timer and a date and time an agreement was reached with the customer.

6. A method for documenting delays comprising:
   initializing a maintenance clock upon commencement of a project, wherein the maintenance clock continuously accumulates an overall project time from a commencement to a closeout of the project;
   dispatching a service person to a field location of the project;
   while in the field, receiving an option from a user interface of a communications device to display a delay maintenance timer entry page where project information related to an encountered delay is entered, wherein the communications device receives user log information to create a communication session and uploads the project information related to the encountered delay during the communication session;
   receiving the project information related to the encountered delay from the communications device at the field location;
   establishing the communications session with a server by launching the user interface in response to a selection of an icon on the communication device that represents the option;
   invoking, by the server, a delay maintenance timer that is in communication with the server for encountered delays that are excusable by submitting the project information;
   aggregating excusable delay encountered during the project at the delay maintenance timer in response to invocation by the server;
   subtracting the amount of excusable delay time from the overall project time to determine the discounted project time; and
   comparing the discounted project time to a service installation guarantee threshold to determine if the project was completed within the service installation guarantee threshold.

7. The method of claim 6, wherein the project information related to the delay comprises one or more of a name of a person authorizing the amount of delay time; a customer name; a telephone number of the customer; a reason for the delay; a date and time the agreement was reached with the customer; a return date and time on which performance of the task should be resumed; and comments.

8. The method of claim 6, wherein inputting the project information includes a user interface, wherein the user interface has dedicated fields to received various components of the project information.

9. The method of claim 6, wherein the delay maintenance timer is resident at a legacy system.

10. The method of claim 6, wherein subtracting the amount of delay time from the overall project time is performed by a legacy system that hosts the maintenance clock.

11. A method for documenting justifiable delay time associated with a project having a service installation guarantee threshold comprising:
   initializing a maintenance clock upon commencement of the project, wherein the maintenance clock continuously accumulates an overall project time from the commencement to a closeout of the project;
   dispatching a person to a field location associated with the project;
   encountering a delay at the field location which is justifiable;
   gathering project information associated with the delay at the field location;
   determining whether the delay is a justifiable based on a set of established rules, wherein the justifiable delay is a reason for delay caused by the customer;
   if the delay is justifiable then:
      receiving justifiable delay information from a communications device at the field location;
      establishing a communications session with a server via the communications device;
      uploading the project information from the communications device to the server;
      updating a delay maintenance timer by the server with an amount of justifiable delay time derived from the project information; and
   subtracting the amount of justifiable delay time from the overall project time at the closeout of project to determine a discounted project time, wherein the discounted project time is compared to the service installation guarantee threshold to determine if the project was completed within the service installation guarantee threshold.

12. The method of claim 11, wherein the project is a task regulated by a governmental agency.

13. The method of claim 11, wherein the established rules include imposition of a fine if the overall project time exceeds a threshold.

14. The method of claim 11, wherein the established rules are service installation guarantee rules.

15. The method of claim 11, wherein the delay maintenance timer resides at a legacy system that hosts the maintenance clock.

16. The method of claim 11, wherein the delay maintenance timer resides at the server.

17. The method of claim 11, wherein the maintenance clock is a component of a Work Force Administration-Control system.

18. The method of claim 11, wherein a justifiable delay includes at least one of adverse weather conditions, lack of equipment, lack of technical expertise, customer postponement; customer is unavailable to accept restoration of service until all repairs are completed, and circuit verification is required by customer, the user selecting an option from a user interface to display a delay maintenance timer entry page where the project information related to the delay is entered; and wherein the communications device receives user log in information to create a communication session and to upload the project information related to the delay during the communication session.

19. The method of claim 11, wherein the project information related to the delay comprises one or more of a name of a person authorizing the amount of delay time, a customer name, a telephone number of the customer, a reason for the delay, a date and time the agreement was reached with the customer, a return date and time on which performance of the task should be resumed, and comments.

20. The method of claim 15, wherein the legacy system comprises at least one of a loop facility assignment control system, a loop maintenance operations system, a secure network element contract server, a mechanized time reporting system a work activity statistical sampling system and a computer system for mainframe operations.

* * * * *